(12) United States Patent
Carnelos et al.

(10) Patent No.: US 10,729,243 B2
(45) Date of Patent: Aug. 4, 2020

(54) JOINING DEVICE, PARTICULARLY FOR JOINING A SHELF TO A WALL OF A PIECE OF FURNITURE

(71) Applicant: FERRAMENTA LIVENZA—SOCIETA' A RESPONSABILITA' LIMITATA, Brugnera (IT)

(72) Inventors: Luca Carnelos, Polcenigo (IT); Simone Della Rosa, Fontanafredda (IT); Giulio Durigon, San Vito Al Tagliamento (IT); Abramo Ivan, Porcia (IT); Davide Verziagi, Fontanafredda (IT); Christian Zonta, Sesto Al Reghena (IT); Mattia Ciol, Chions (IT)

(73) Assignee: FERRAMENTA LIVENZA—SOCIETA'A RESPONSIBILITA' LIMITATA, Brugnera (IT)

( * ) Notice: Subject to any disclaimer, the term of this patent is extended or adjusted under 35 U.S.C. 154(b) by 432 days.

(21) Appl. No.: 15/739,648

(22) PCT Filed: Jun. 29, 2016

(86) PCT No.: PCT/EP2016/065162
§ 371 (c)(1),
(2) Date: Dec. 22, 2017

(87) PCT Pub. No.: WO2017/001488
PCT Pub. Date: Jan. 5, 2017

(65) Prior Publication Data
US 2018/0184808 A1    Jul. 5, 2018

(30) Foreign Application Priority Data
Jun. 29, 2015  (IT) .................. 102015000028424

(51) Int. Cl.
*A47B 96/06* (2006.01)
*F16B 12/20* (2006.01)
*F16B 12/46* (2006.01)

(52) U.S. Cl.
CPC ........ *A47B 96/066* (2013.01); *F16B 12/2063* (2013.01); *F16B 12/46* (2013.01)

(58) Field of Classification Search
CPC .... F16B 7/0466; F16B 12/2063; F16B 12/18; F16B 12/20; F16B 12/24; F16B 12/2009
See application file for complete search history.

(56) References Cited

U.S. PATENT DOCUMENTS 4,869,614 A * 9/1989 Fisher ................. F16B 12/2063
                                                            403/8
5,295,756 A * 3/1994 Ohta .................. H01R 13/6215
                                                           403/11

(Continued)

FOREIGN PATENT DOCUMENTS

EP          1469206 A1     10/2004
WO      2008076089 A2       6/2008

OTHER PUBLICATIONS

International Search Report dated Sep. 13, 2016 re: Application No. PCT/EP2016/065162; pp. 1-3; citing: U.S. Pat. No. 5,743,670 A and WO 2008/076089 A2.

(Continued)

*Primary Examiner* — Daniel J Wiley
(74) *Attorney, Agent, or Firm* — Cantor Colburn LLP

(57) ABSTRACT

A joining device, particularly for joining a shelf to a wall of a piece of furniture, having a cylindrical body associated in a first hole adapted to be provided transversely in the shelf and having a first axial seat for the rotatable coupling of a first stem of a screw provided with a first crown-shaped head that can be arranged rotatably within a second seat that is adjacent to the first seat. A second hole is adapted to be (Continued)

provided in the shelf at right angles to the first hole and accommodates, substantially flush with or below the upper surface, an insert. The insert is provided with a seventh seat for the third head of a first tool coupled rotatably with the first crown-shaped head.

23 Claims, 8 Drawing Sheets

(56) References Cited

U.S. PATENT DOCUMENTS

| | | | |
|---|---|---|---|
| 5,743,670 A * | 4/1998 | Ader ..................... | E04B 1/6137 403/11 |
| 2018/0238366 A1* | 8/2018 | Cattaneo ............. | F16B 12/2063 |

OTHER PUBLICATIONS

Written Opinion dated Sep. 13, 2016 re: Application No. PCT/EP2016/065162; pp. 1-5; citing: U.S. Pat. No. 5,743,670 A and WO 2008/076089 A2.

* cited by examiner

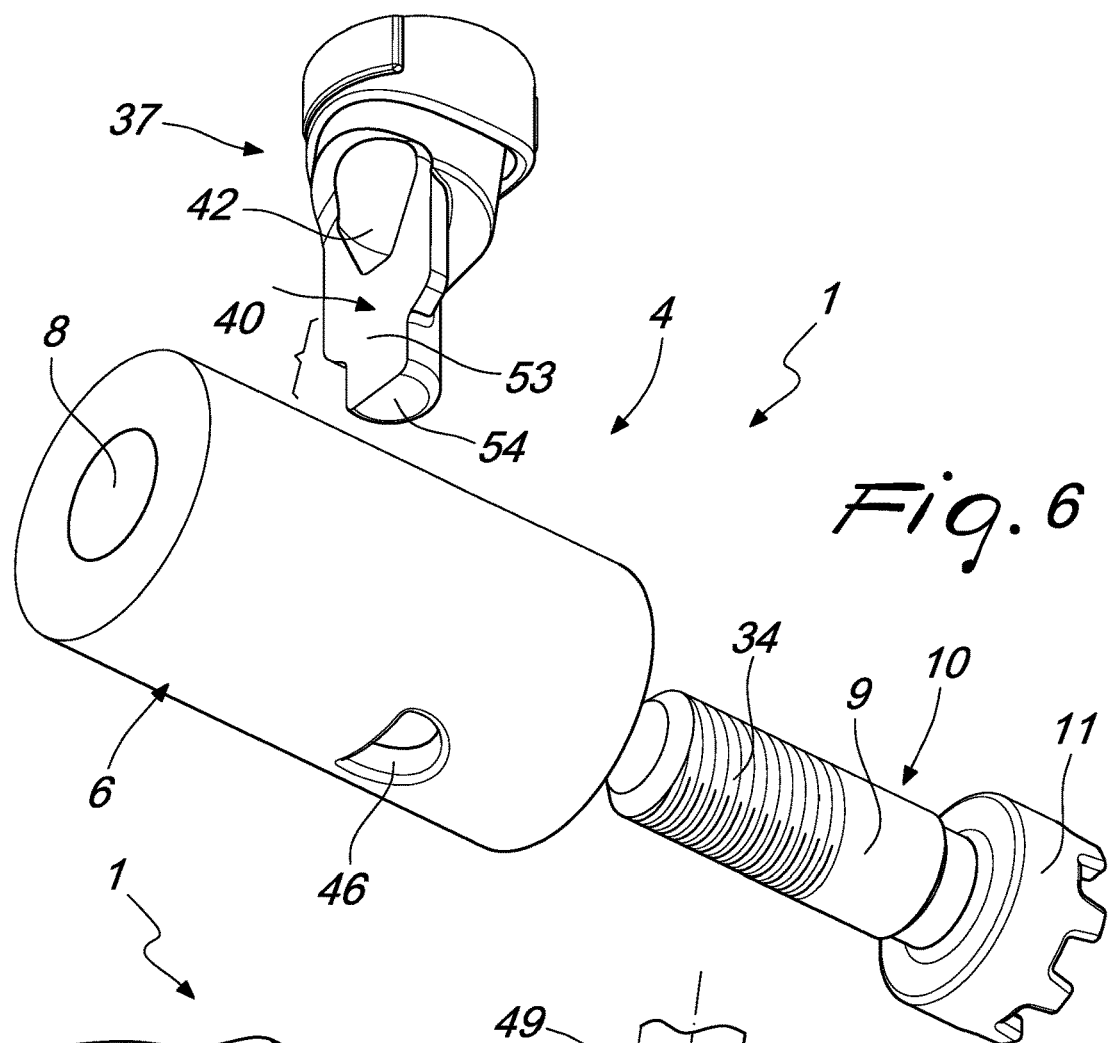
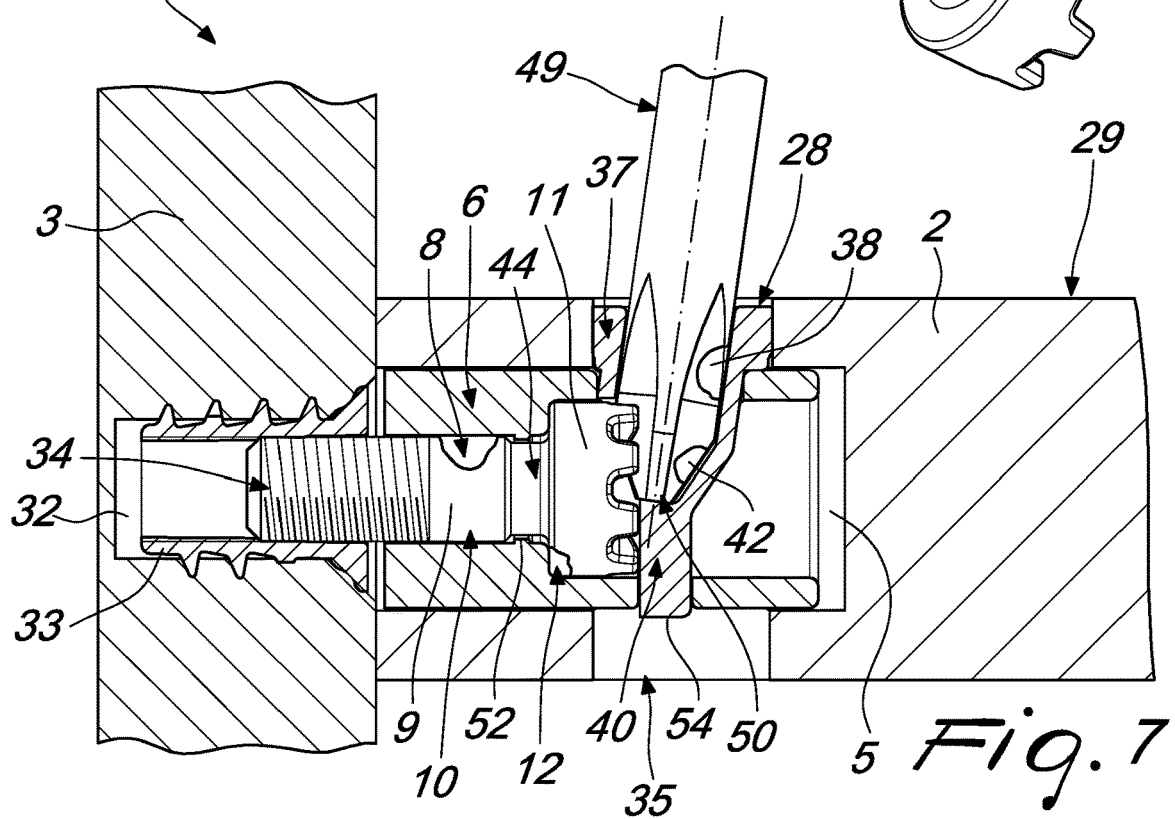
Fig. 6
Fig. 7

JOINING DEVICE, PARTICULARLY FOR JOINING A SHELF TO A WALL OF A PIECE OF FURNITURE

TECHNICAL FIELD

The present disclosure relates to a joining device, particularly for joining a shelf to a wall of a piece of furniture.

BACKGROUND

Currently, Italian utility model no. 262995, filed with Italian patent application PN2005U000035, is known which claims a joint, for the detachable connection of two structural elements of a piece of furniture that mutually abut at right angles, comprising an accommodation body that can be associated with a first structural element and is adapted to engage a fixing element that can be associated with a second structural element and an actuation element that is arranged in the accommodation body and is adapted to cooperate with the fixing element so as to mutually fix the structural elements, the fixing element comprising a toothed head that is in one piece with a stem of a screw, the head being coupled rotatably within the accommodation body and the screw stem protruding from the accommodation body, the actuation element comprising a crown gear that is adapted to actuate the head in order to screw the screw stem into the second structural element.

This solution suffers drawbacks: a high production and assembly cost is in fact noted, due to the structural complexity of the joint, the need to provide the joint in various sizes/dimensions as a function of the thickness of the panel, the need to use the joint on panels with high minimum thicknesses, a considerable aesthetic impact since the joint exposes the flat edge that must be applied so as to affect one edge of the panel, and the need to provide two holes/seats on the panel for the placement of the accommodation body and of the pin, the execution of which is complicated.

The accommodation body has a cylindrical shape and is divided diametrically into two components, which must be joined in order to clamp the crown gear and the fixing element: a high degree of clamping might not allow optimum interaction between the gears, while clamping provided with the presence of plays might lead to difficulty in activating the gears due to possible mutual jamming of the teeth.

Furthermore, the crown gear and the fixing element are embedded in the accommodation body: in case of maintenance on the crown gear it is necessary to remove the entire accommodation body from the panel and therefore open, in practice breaking it, the accommodation body in order to access the internal components; in practice, in case of maintenance, it is thus necessary to replace the entire joint; moreover, the panel is also ruined in this case.

This solution makes it necessary to provide a further hole in the panel in order to be able to perform any adjustment of a leveling foot associated with the piece of furniture.

Finally, this structure is bulky and is therefore difficult to install if thin panels are used.

WO 2008/076089 is also known which discloses a solution for obtaining the connection of construction elements such as a panel; this solution comprises a threaded bush and a frame that can be arranged within a hole provided transversely to the panel; the following are placed inside the frame: a first screw, provided with a crown-shaped head; a bushing, which is externally threaded and is associated rotatably with a first complementary thread provided axially to the frame; a precompressed spring; a second screw, the head of which has a seat for accommodating such spring and the stem of the first screw; a third screw, which is arranged transversely to such first screw and the head of which interacts with the head of the first screw, according to a crown gear-pinion system.

The elements contained in the frame are fixed stably to the structure of the frame by way of a first threaded ring, which is associated rotatably with a second complementary thread provided axially to the frame, at an end thereof, keeping in position the second screw, and by a second ring, which is associated rotatably with a third complementary thread provided tangentially to the frame, at one end thereof, keeping the third screw in position.

Moreover a solution is provided in which a hole is provided in a panel to allow adjustment of the second screw.

This solution, also, suffers drawbacks: the third screw, once screwed to the frame, is fixed in its position and is no longer removable and therefore it is not possible to perform any maintenance in case of malfunctions or wear.

Furthermore, in this solution the head of the first screw works in contrast with an externally threaded bush that is associated rotatably with the first complementary thread provided axially to the frame; if the bush loosens, optimum interaction of the head of the first screw with the head of the second screw is no longer permitted, thus making adjustment unattainable.

A similar remark can be made in relation to the rotatable connection of the second screw to the frame by means of the bush.

This solution is structurally complicated, due to the large number of components that constitute the device, requiring a long and laborious preassembly of the various components to the frame, furthermore using a spring that is partially pre-compressed.

This solution, also, makes it necessary to provide an additional hole in the panel in order to be able to perform any adjustment of a leveling foot associated with the piece of furniture.

Finally, this structure, also, is bulky and difficult to install in thin panels.

U.S. Pat. No. 5,743,670A is also known which discloses a joining device, accommodated within a body or structural housing or frame, which is constituted by: a ring gear; a shell that accommodates the stem of the ring gear; a helical spring; a pinion gear; a coupler shaft; a front support.

The coupler shaft is a multi-segment constituted by: a cylindrical segment, which is accommodated at one end inside the shell; a cylindrical central segment, which is provided with a longitudinal retainer slot for a key; a cylindrical collar; a cylindrical coupling segment, which is accommodated in the front support and comprises a longitudinal shaft with a non-threaded segment and a threaded end.

The assembly method of the present known solution provides for a large number of constructive steps and furthermore such solution is structurally complicated due to the large number of components that constitute the device, requiring a preassembly of the various components to the frame that is long and laborious, furthermore using a spring that is partially pre-compressed and additional mechanical means or welds or adhesives as elements for fixing the shell and the front support to the body.

The large number of components, moreover, prevents the application of the device in particularly thin panels.

This solution is also particularly expensive in terms of production costs, due to the large number of components required, and in terms of cost and time required for preassembly of the components.

Finally, in this background art document it is found that maintenance or replacement of the activation element, i.e., of the pinion gear, is long, complicated and laborious, since it requires the complete disassembly of the joint as the pinion gear is the first element that is assembled during assembly and since it is not possible to extract it from the opening as the head of the pinion gear has a larger diameter than the opening.

SUMMARY

The aim of the present disclosure is to eliminate the drawbacks noted above, by providing a joining device that is structurally compact, can be used also on panels that have low thicknesses and requires, for its installation, limited work on the panel, so as to maximize the utilization of the space generated by the work on the panel to provide the disclosure.

Within this aim, the present disclosure provides a joining device that has a limited impact on the panel and the activation of which is simple and effective over time regardless of the machining tolerances both in the panel and in the joint.

The disclosure also provides a joining device on which it is possible to perform maintenance on the activation element rapidly and easily, preserving the integrity of the joint and of the panel.

The disclosure further provides a joining device that allows to achieve an optimum activation thereof, compensating the forces that tend to space the gears, has a high degree of strength of the components and allows optimum clamping of the gears.

A joining device is provided that allows quick, easy and simple adjustment of a leveling foot associated with the piece of furniture in a region below the disclosure itself.

A joining device is provided that further allows to reduce the dimensions of the components so as to allow application in particularly thin panels.

The disclosure further provides a joining device that allows a reduction of the components in use, with a consequent simplification of the product.

The disclosure also provides a joining device the assembly of which to the panel is simple and easy.

The disclosure further provides a joining device that has low manufacturing costs and can be provided with usual and known systems.

These advantages and features that will become better apparent hereinafter, are achieved by providing a joining device, particularly for joining a shelf to a wall of a piece of furniture, comprising a cylindrical body that can be associated in a first hole adapted to be provided transversely in said shelf and provided with a first axial seat for the rotatable coupling of a first stem of a screw provided with a first crown-shaped head that can be arranged rotatably within a second seat that is adjacent to said first seat, characterized in that a second hole is adapted to be provided in said shelf at right angles to said first hole and accommodates, substantially flush with or below the upper surface, an insert, said insert being provided with a seventh seat for the third head of a first tool that can be coupled rotatably with said first crown-shaped head.

BRIEF DESCRIPTION OF THE DRAWINGS

Further characteristics and advantages of the joining device according to the disclosure will become better apparent from the detailed description of a particular but not exclusive embodiment thereof, illustrated by way of non-limiting example in the accompanying drawings, wherein:

FIG. 6 is an exploded view of the joining device in a different embodiment;

FIG. 7 is a sectional view of the joining device according to FIG. 6;

DETAILED DESCRIPTION OF THE DRAWINGS

Figure 1:
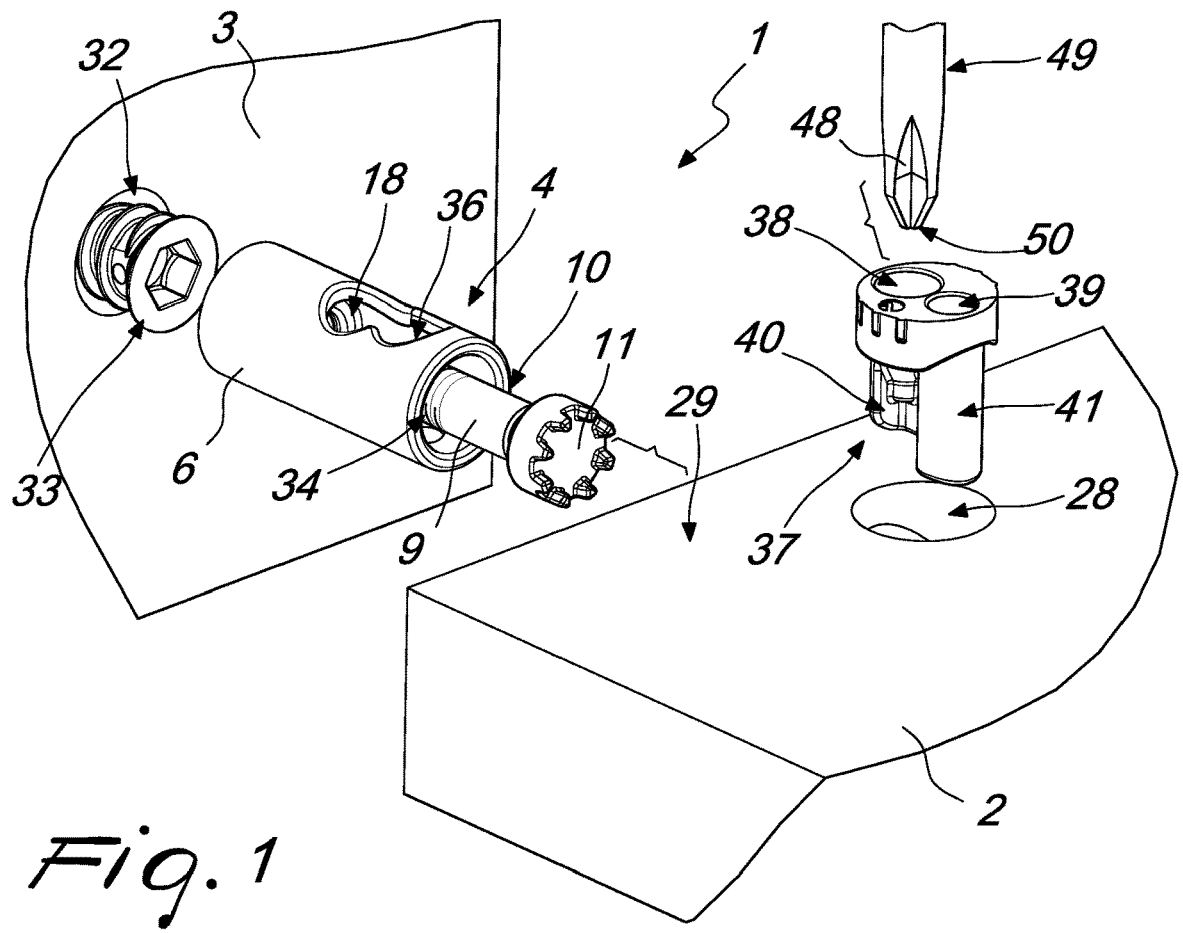
FIG. 1 is an exploded view of a joining device according to the disclosure.
Figure 2:
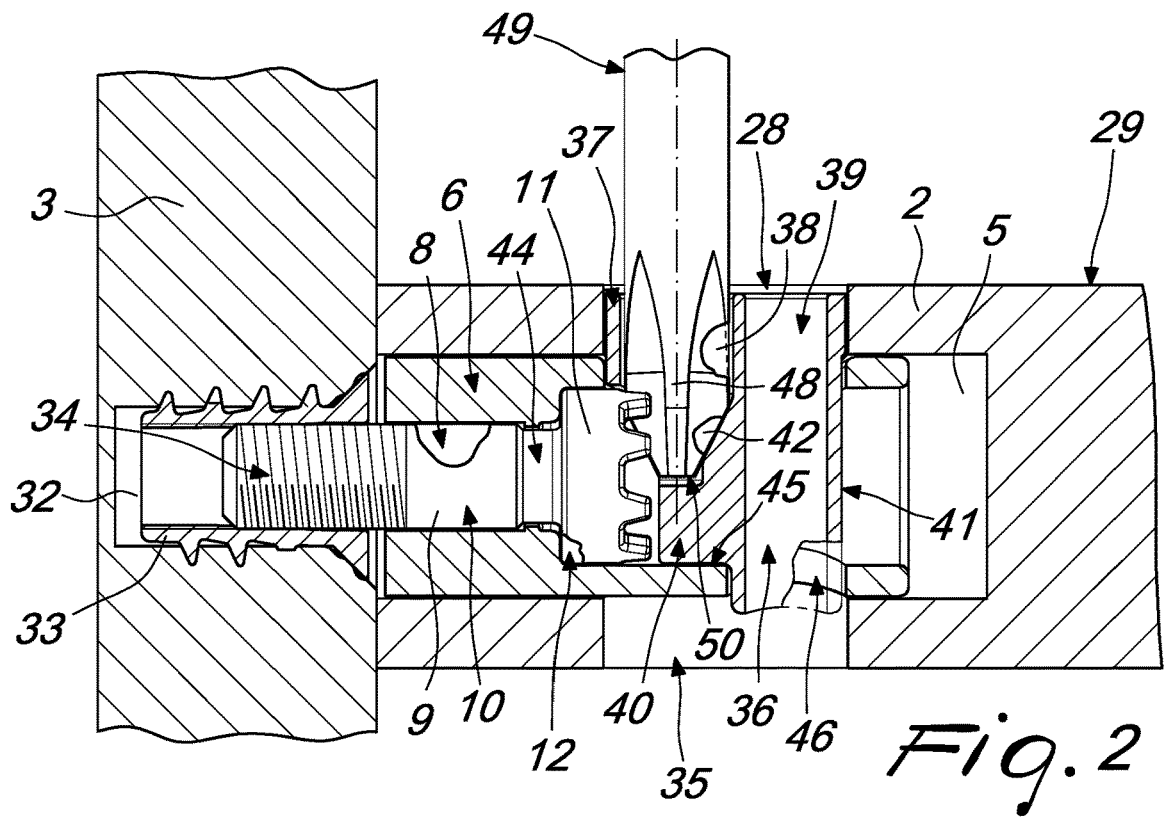
FIG. 2 is a sectional view of the joining device.
Figure 3:
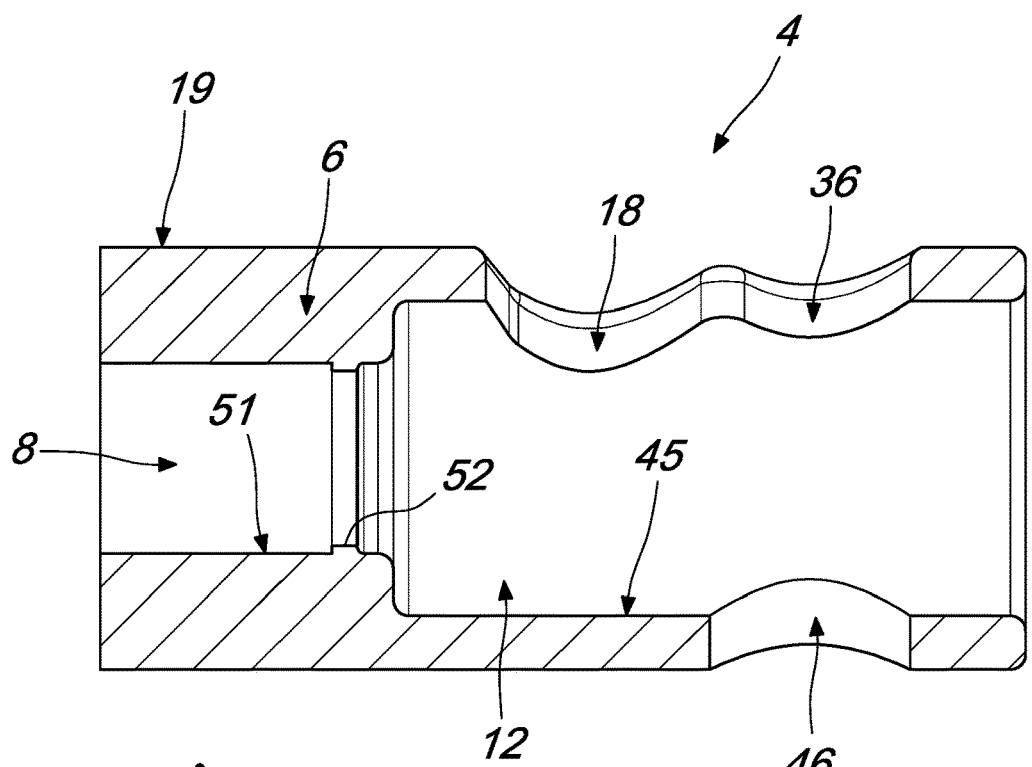
FIG. 3 is a view, similar to FIG. 2, of the cylindrical body alone, without the screw with crown-shaped head.
Figure 4:
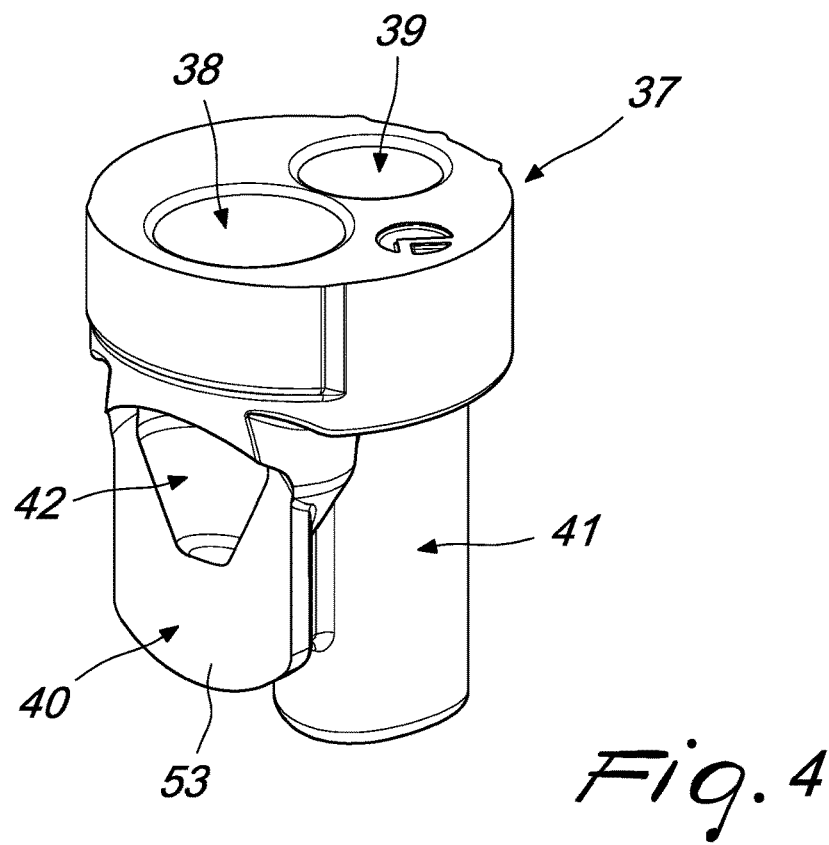
FIG. 4 is a side perspective view of the bush.

In the exemplary embodiments that follow, individual characteristics, given in relation to specific examples, may actually be interchanged with other different characteristics that exist in other exemplary embodiments.

With reference to the figures, the reference numeral 1 designates a joining device, particularly for joining a shelf 2 to a wall 3 of a piece of furniture.

The joining device 1 is constituted by a cylindrical body 4, which can be arranged in a complementarily shaped first hole 5 that is adapted to be provided transversely to the shelf 2 through part of its thickness.

The cylindrical body 4 is composed of a single shell 6 that has a substantially cylindrical and internally hollow shape, so as to define, starting from the end directed toward the wall 3 and along part of the length of the cylindrical body 4, a first axial seat 8 for the rotary coupling of a first stem 9 of a screw 10 provided with a first crown-shaped head 11.

The first stem 9 rests rotatably on the inner lateral surface 51 of the shell 6 defined at the first seat 8; advantageously, proximate to the part of the first stem 9 that protrudes from the first head 11 of the screw 10 there is an annular recess 44 that interacts with an annular tooth 52 adapted to block the axial sliding of the screw 10.

The first head 11 of the screw 10 can be arranged rotatably within a second seat 12, obtained along a same axis as the first seat 8 and contiguous thereto, having a substantially cylindrical shape.

The first head 11 of the screw 10 protrudes within the second seat 12.

The shell 6 has an outer lateral surface 19 on which there is, at right angles to the axis of the first seat 8 and of the second seat 12 and therefore to the axis of the first stem 9, a third seat or hole 18, which passes through the shell 6 or not and inside which it is possible to arrange temporarily a third head 48 of a first tool 49, such as for example a screwdriver, which can be coupled rotatably to the first crown-shaped head 11 accommodated in the second seat 12.

A separate sixth seat or hole 36 is provided in the shell 6, to the side of the third seat or hole 18 and parallel thereto and on the opposite side with respect to the first head 11 of the screw 10, affecting the entire diameter of the shell 6 and therefore passing through it.

A second hole 28 is adapted to be provided in the shelf 2, at right angles to the first hole 5 and connected thereto, and accommodates, substantially flush with or below the upper surface 29, an insert 37.

The insert 37 has a substantially cylindrical shape and has a height that is greater than the distance that lies, once the joining device 1 has been assembled, between the upper surface 29 of the shelf 2 and the outer lateral surface 19 of the shell 6, so that the insert 37, once installed, rests on the first head 11 of the screw 10 while remaining substantially flush with the shelf 2.

The insert 37 locks the cylindrical body 4 with respect to the shelf 2 and thus acts as extraction prevention or bolt.

A seventh seat 38 is provided in the insert 37 and is axially offset with respect to the central axis so as to lie along the same axis as the third seat or hole 18.

The seventh seat 38 has such a diameter as to allow the temporary placement inside it of the third head or tip 48 of the first tool 49.

An eighth seat 39, also axially offset with respect to the central axis, so as to arrange itself along the same axis as the sixth seat or hole 36, is provided adjacent to the seventh seat 38 and parallel thereto.

The eighth seat 39 has such a diameter as to allow the passage of a second tool, such as a hex key or a screwdriver, for the optional adjustment of a foot associated with the piece of furniture in a region that lies below and is axially aligned with the eighth seat 39.

The insert 37 can be inserted within the third and sixth seat or hole 18, 36 provided in the cylindrical body 4 and has a first wing and a second wing 40, 41 that protrude from it in a lower region.

The first wing 40 rests in a lower region on the inner lateral surface 45 of the shell 6, protrudes and is extended at the side of the seventh seat or hole 38 adjacent to the eighth seat 39.

The third head 48 of the first tool 49 can be arranged temporarily in the seventh seat or hole 38.

The flat lateral surface 53 of the first wing 40 directed toward the first head 11 of the screw 10 is partially hollow so as to obtain a ninth seat 42, which is shaped complementarily to the end 50 of the third head 48 of the first tool 49, such as a cross-head screwdriver.

The rotatable interconnection of the first tool 49 therefore occurs by way of the presence of the ninth seat 42 provided in the first wing 40, which forces the mating of the third head 48 with the first head 11 of the screw 10.

The second wing 41 surrounds and defines the eighth seat 39 and is located within the sixth seat 36, which is connected in a lower region to a complementarily shaped fifth hole 46 provided in the cylindrical body 4.

The second wing 41 has a height that is slightly lower than that of the second hole 28.

Since the sixth seat 36 passes through the cylindrical body 4, an access is provided for a second tool that is adapted to allow the optional adjustment of a foot that is associated in a lower region with the shelf 2 if it acts as the bottom of the piece of furniture.

A third hole 32 is adapted to be provided transversely in the wall 3 and an internally threaded bushing 33 can be arranged or screwed therein for the interconnection of the third end 34 of the first stem 9 of the screw 10.

The interconnection can also be achieved in a different manner for example, the first stem 9 can have a thread for chipboard.

A fourth hole 35 is adapted to be provided on the lower surface of the shelf 2 that lies opposite the upper surface 29, is parallel to the third seat 18 and the sixth seat 36, and matches up with the second hole 28.

In its use, the disclosure is therefore constituted by a joining device 1 of the concealed type, in that it is entirely accommodated both in the shelf 2 and in the wall 3, only the second hole 28 being visible.

After placing the screw 10 inside the shell 6, the cylindrical body 4 is inserted in the first hole 5 and then the insert 37 is inserted through the second hole 28, adapted to be provided in the shelf 2: the cylindrical body 4 is thus locked temporarily to the shelf 2.

In order to activate the device, the first tool 48 is inserted in the seventh seat 38; the rotation imparted to the first tool 48 activates the screw 10, which screws into the threaded bushing 33 associated with the wall 3.

Figure 5:
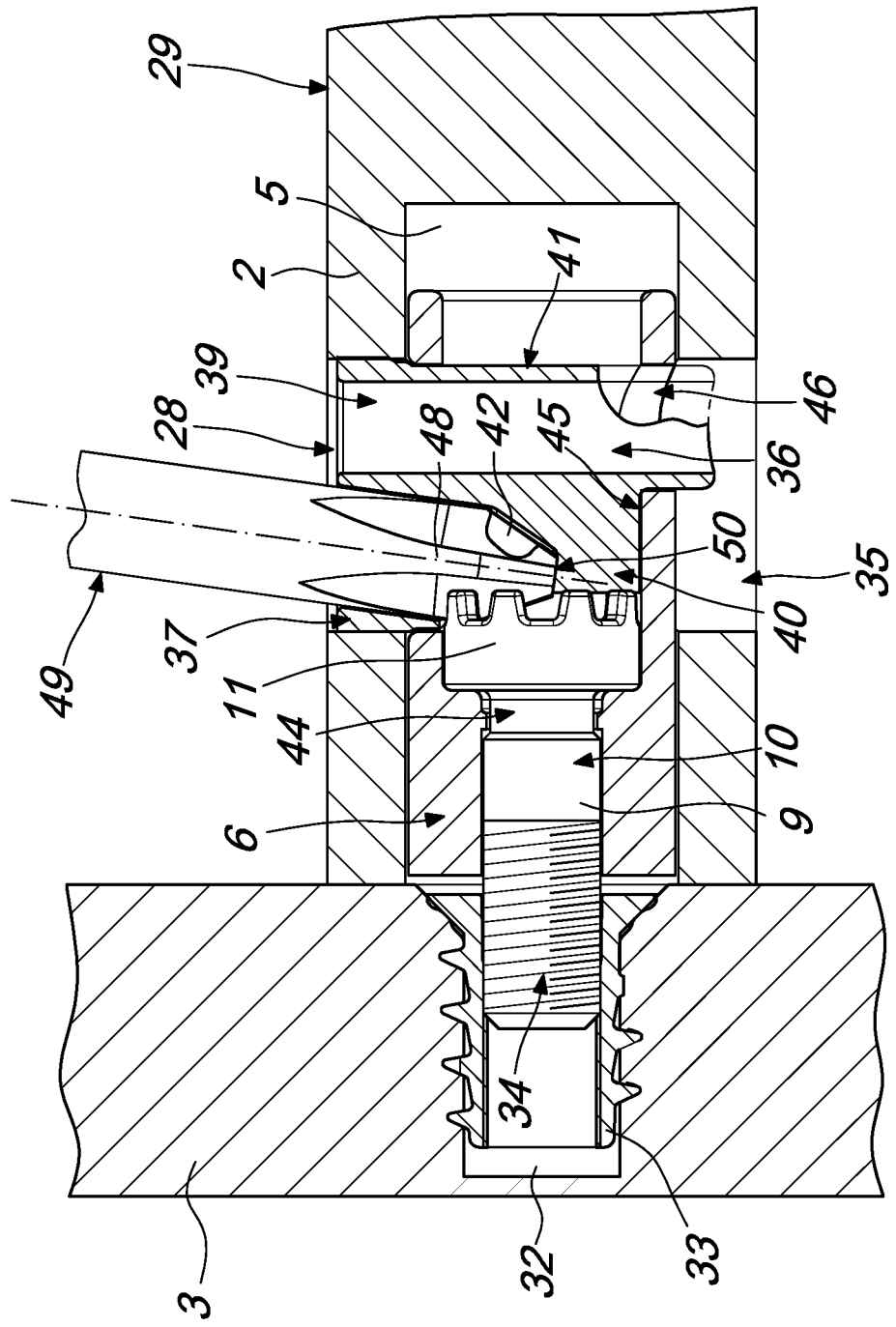
FIG. 5 is a sectional view of the joining device according to a different embodiment.
Figure 8:
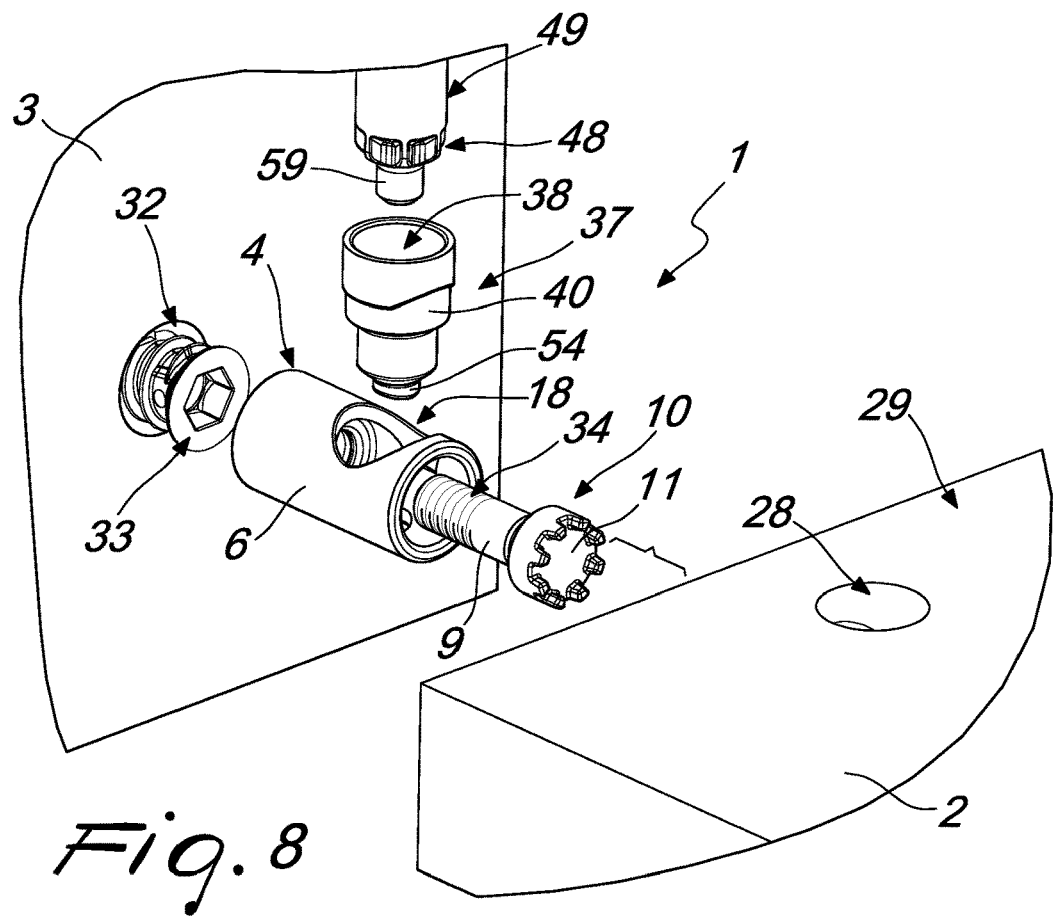
FIG. 8 is an exploded view of the joining device in a different embodiment.
Figure 9:
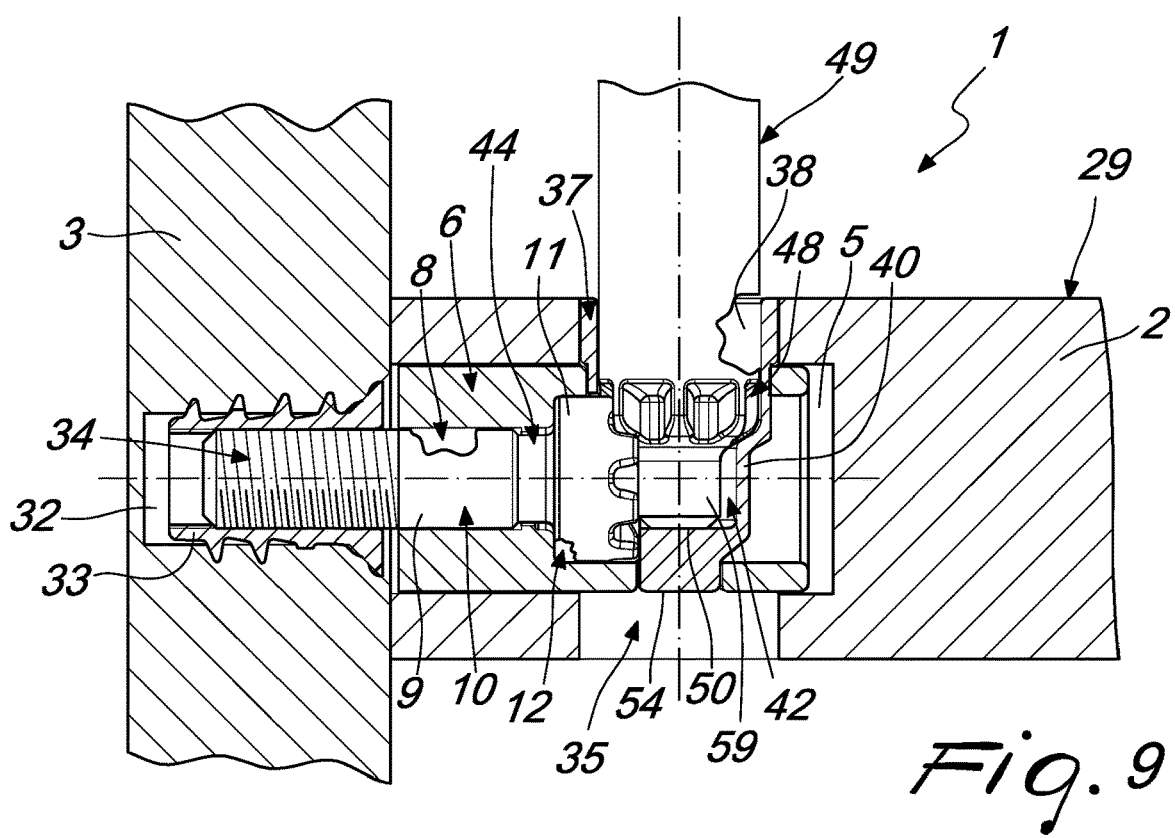
FIG. 9 is a sectional view of the joining device according to FIG. 8.
Figure 10:
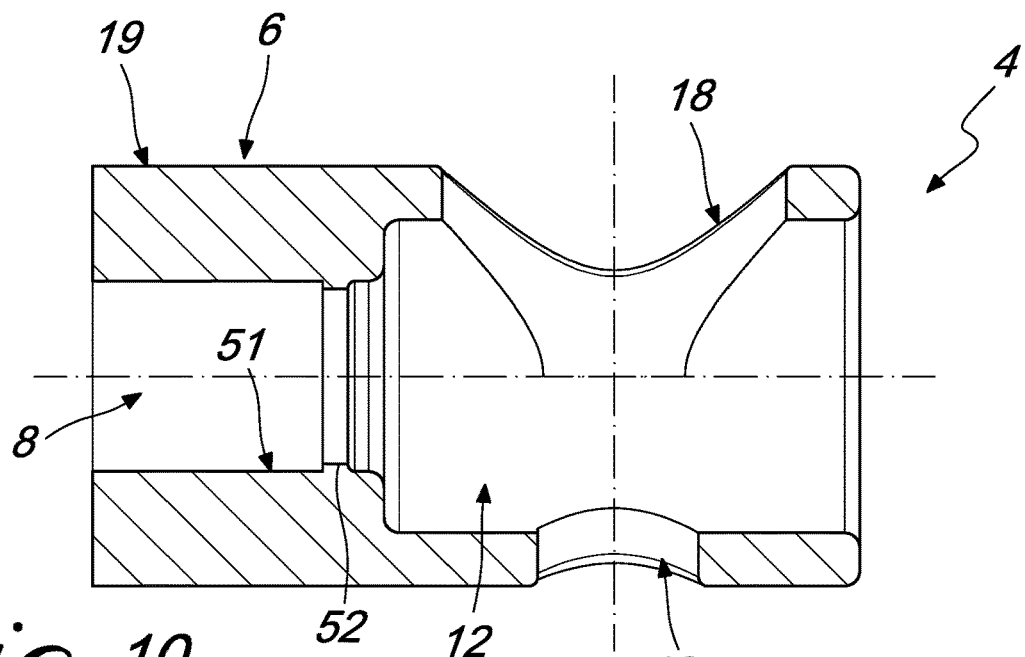
FIG. 10 is a view, similar to FIG. 9, of the cylindrical body alone, without the screw with crown-shaped head.
Figure 11:
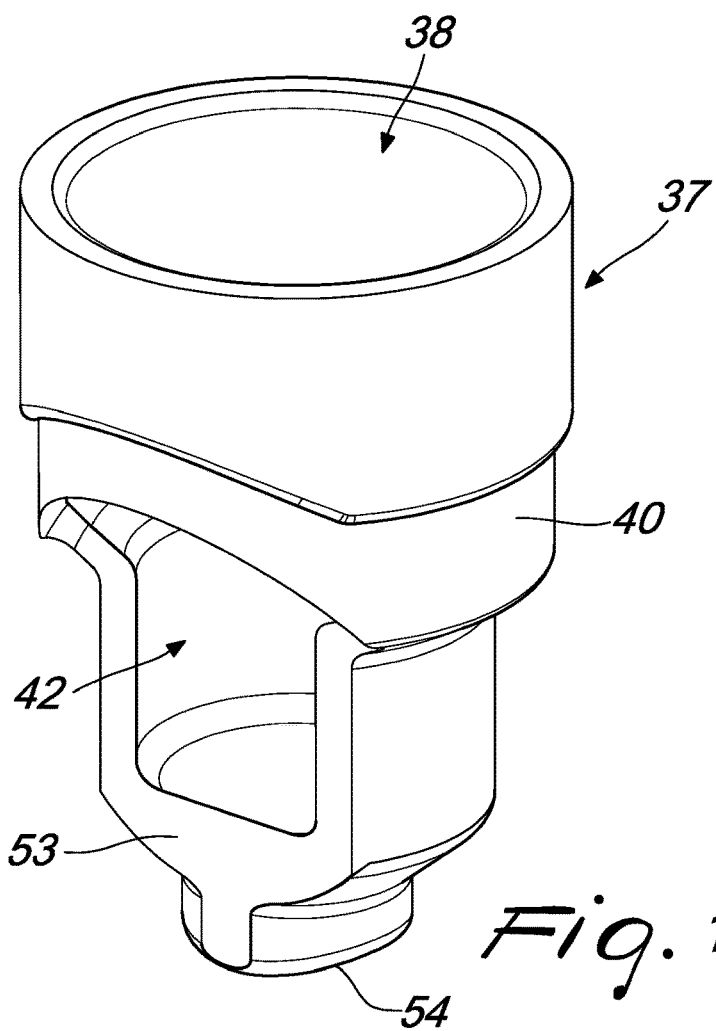
FIG. 11 is a side perspective view of the insert.
Figure 12:
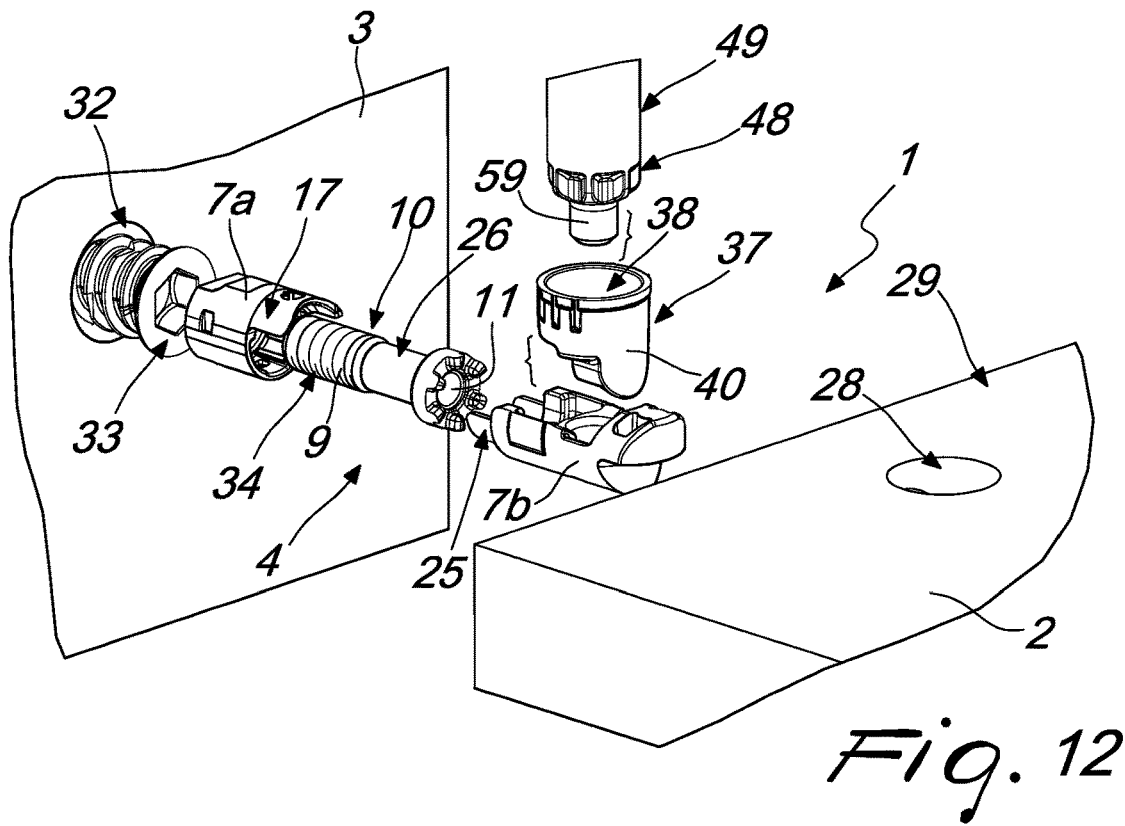
FIG. 12 is an exploded view of the joining device in a different embodiment.
Figure 13:
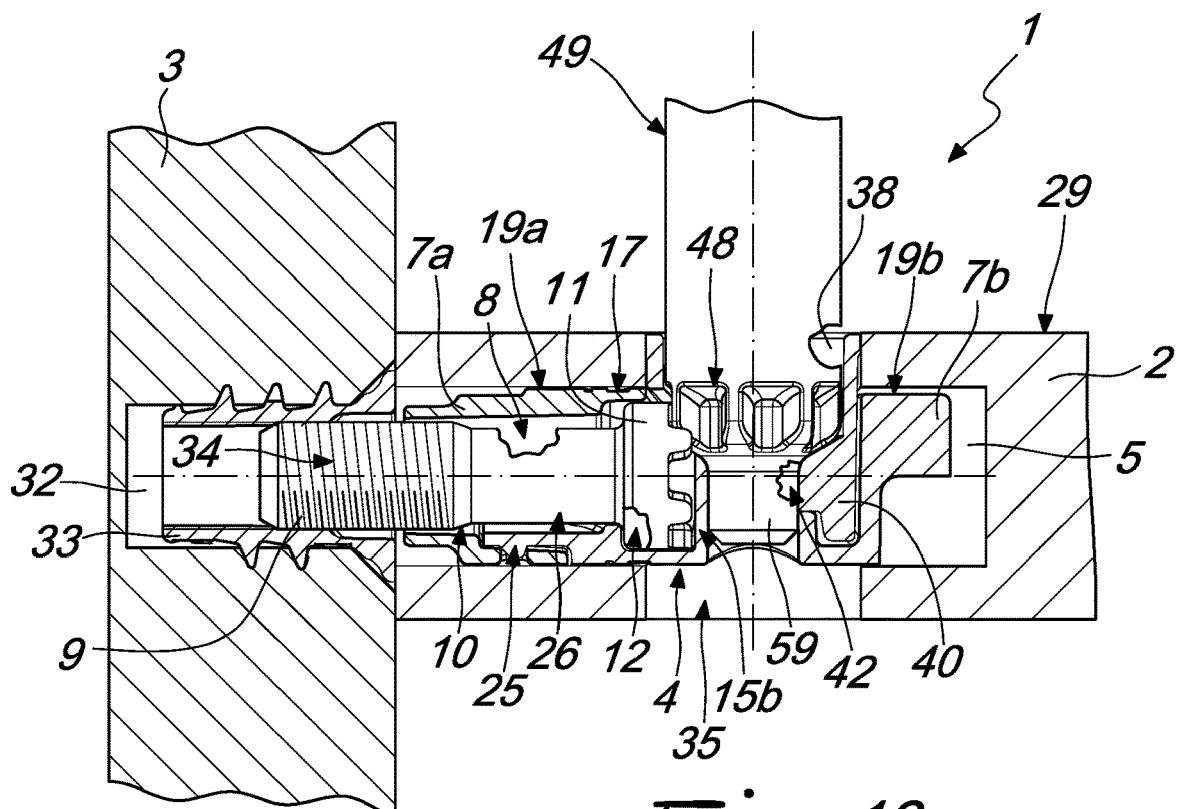
FIG. 13 is a sectional view of the joining device according to FIG. 12.
Figure 14:
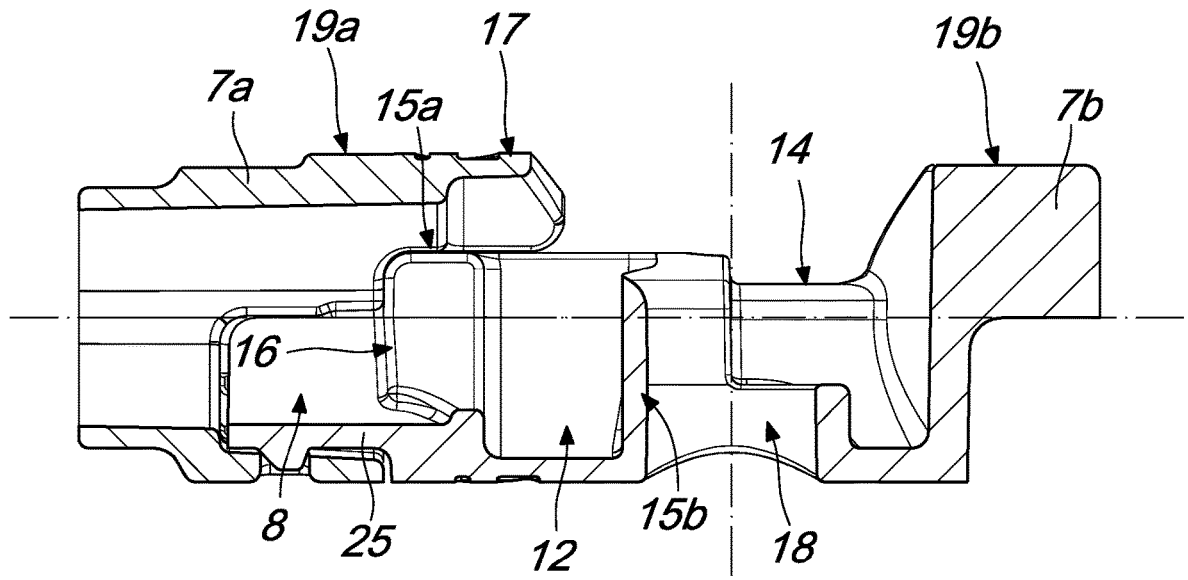
FIG. 14 is a view, similar to FIG. 13, of the cylindrical body alone, without the screw with crown-shaped head.
Figure 15:
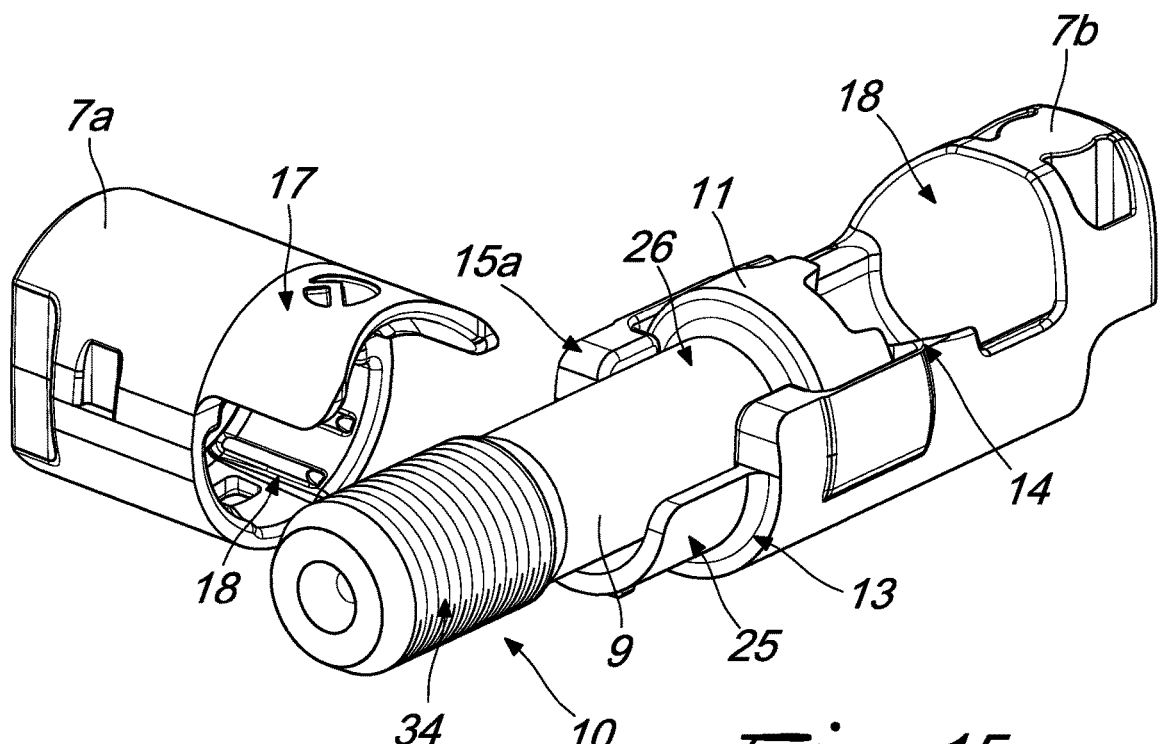
FIG. 15 is a side perspective view of the cylindrical body.

In the constructive solution shown in FIG. 5, the seventh seat 38, provided in the insert 37, is axially offset with respect to the axis that is perpendicular to the shelf 2 and is also axially offset with respect to the axis of the third seat or hole 18, so as to be inclined to form an acute angle, considering a counterclockwise rotation as positive, with respect to the plane of arrangement of the upper surface 29 of the shelf 2.

Moreover, the ninth seat 42 provided on the flat lateral surface 53 of the first wing 40 has the same axis as the seventh seat 38.

The ninth seat 42 is again shaped complementarily to the end 50 of the third head 48 of the first tool 49, such as a cross-head screwdriver, which therefore can again be coupled rotatably to the first crown-shaped head 11.

FIGS. 6 and 7 show a variation for the insert 37 which comprises only the first wing 40, which surrounds and defines the seventh seat 38.

The seventh seat 38 has the same shape as the embodiment shown in FIG. 5 and is thus axially offset with respect to the axis that is perpendicular to the shelf 2 and with respect to the axis of the third seat or hole 18, so as to arrange itself so that it is inclined to form an acute angle, considering a counterclockwise rotation as positive, with respect to the plane of arrangement of the upper surface 29 of the shelf 2.

Thus, the ninth seat 42 is again provided on the flat lateral surface 53 of the first wing 40, has the same axis as the seventh seat 38, and is again shaped complementarily to the end 50 of the third head 48 of the first tool 49, such as a cross-head screwdriver, which therefore can be again coupled rotatably to the first crown-shaped head 11.

The lower free end 54 of the first wing 40 is located at the fifth hole 46 provided in the cylindrical body 4.

FIGS. 8 to 12 show a different embodiment for the insert 37 and for the third head 48 of the first tool 49.

In this case, a single seventh seat 38 is provided along the central axis on the cylindrical insert 37, so that the insert 37 arranges itself along the same axis as the third seat or hole 18 that passes through the single shell 6.

The insert 37 has a first wing 40, which affects part of its total length and the lower free end 54 of which has a smaller diameter, so as to be accommodated within the complementarily shaped fifth hole 46 provided in the single shell 6.

The flat lateral surface 53 of the first wing 40 directed toward the first head 11 of the screw 10 is partially hollow so as to obtain a ninth seat 42.

The insert 37 has a height that is substantially lower than the depth of the second hole 28.

The insert 37 can be inserted within the third seat or hole 18 provided in the cylindrical body 4.

The seventh seat 38 has such a diameter as to allow the temporary placement inside it of the third head 48 of the first tool 49.

The third head 48 of the first tool 49 has a substantially pinion-like shape and is adapted to couple kinematically to the first head 11 accommodated in the second seat 12; a third stem 59 protrudes from the end thereof and can be accommodated within the complementarily shaped ninth seat 42.

It has thus been found that the disclosure has achieved the intended advantages by providing a joining device 1 which is structurally compact, can be assembled rapidly and simply, can also be used on low-thickness panels and requires, for its installation, limited machining on the panel, so as to maximize the utilization of the space generated by the machining on the panel to provide the disclosure, also avoiding spoiling it.

Furthermore, it has a scarce impact on the panel due to its concealed insertion, since the joining device 1 is accommodated entirely both in the shelf 2 and in the wall 3, only the second hole 28 being visible.

Furthermore, it has been observed that the seventh seat 38 of the insert 37 allows both to accommodate an activation element, i.e., the first tool 49, and to insert it after the insertion of the cylindrical body 4, with the screw 10 inside it, in the shelf 2, making the activation of the first tool 49 simple and effective over time regardless of the machining tolerances both in the panel and in the components of the device; the simple rotation imparted to the first tool 49 through the second hole 28 and through the seventh seat 38 of the insert 37 in fact allows to screw the first screw 10 into the threaded bushing 33 associated with the wall 3.

Furthermore, it has been found that the insert 37 also performs the extraction-prevention or bolt function, thanks to the fact that the insert 37 is inserted within the second hole 28 adapted to be provided in the shelf 2, so as to be substantially flush with or below the upper surface 29 of the shelf 2, thus allowing to lock the cylindrical body 4 within the shelf 2.

Furthermore, it has been observed that maintenance of the insert 37 occurs rapidly and easily, since it is simply removable from the cylindrical body 4 through the second hole 28 in which it is accommodated, without having to extract the cylindrical body 4 from the shelf 2, and is equally simply replaceable.

Finally, it has been observed that the disclosure has allowed to achieve a reduction of the components in use, since the joining device 1 is constituted by three fundamental elements, such as the cylindrical body 4, the screw 10 and the insert 37, with the addition of an activation element, such as the first tool 49, achieving a simplification of the product and therefore allowing to achieve compactness of the joining device 1 as well as its application in particularly thin panels.

The provision of a single shell 6 and the use of a single guiding insert 37 for each joining device 1 and of a first tool 49 for each piece of furniture, acting as replacements of other devices used in the background art which are more complicated components to be manufactured, also allows to reduce the costs of the disclosure; by way of example, an insert 37 is in fact simpler and cheaper than a pinion; moreover, the use of the joining device 1 allows to use a single activation element, such as the first tool 49, for all the joining devices that are installed in the same piece of furniture, with a consequent saving on the number of components to be used, and not an activation element, such as for example a pinion, for each device of the piece of furniture.

Moreover, it has been found that the use of the first tool 48 as an element for the activation and clamping of the joining device 1 allows to perform a safe and irreversible coupling that cannot be released accidentally.

Moreover, in the embodiment shown from FIG. 1 to FIG. 7 it has been observed that the eighth seat 39 provided in the insert 37 acts as a passage seat for a second tool for the optional adjustment of a foot associated with such piece of furniture, a single hole 28 having to be provided in the upper surface 29 of the shelf 2, thus achieving a rapid, easy and simple adjustment of a leveling foot associated with the piece of furniture in a region that lies below such disclosure.

In the embodiment shown from FIG. 8 to FIG. 11, it has been observed that access to the leveling foot associated with the piece of furniture in a region below the disclosure itself is coaxial to the axis of the first tool 49 used to close the joining device 1, allowing therefore to achieve a reduction in the size of the insert 37 that is visible once the panels are joined, having a limited impact on the panel 2.

Finally, it has been found that the particular substantially pinion-like shape of the third head 48 of the first tool 49 allows to optimize the coupling of the first tool 49 with the crown-shaped head 11 of the screw 10, increasing therefore the strength of the joining device 1.

Obviously, the disclosure is susceptible of numerous modifications and variations.

Thus, for example, in the embodiments shown in FIG. 12 to FIG. 15, the cylindrical body 4 can be constituted by a first half-shell and a second half-shell 7a, 7b, which have a substantially cylindrical and internally hollow shape and can be coupled axially by front coupling.

The first half-shell 7a has a first axial seat 8 for the rotary coupling of a first stem 9 of a screw 10 provided with a first crown-shaped head 11.

The first head 11 of the screw 10 can be arranged rotatably within a second seat 12 provided proximate to the end 13, cut along a chord so as to define a flat portion 14, of the second half-shell 7b that is directed toward the first half-shell 7a.

The second seat 12 is obtained along a plane that is perpendicular to the plane of arrangement of the first seat 8, has a substantially semicircular shape and is located between two partitions 15a, 15b, of which the front one 15a, directed toward the first half-shell 7a, has a semicircular opening 16 for the placement and passage of the first stem 9 along the same axis as the first seat 8.

Part of the first head 11 of the screw 10 therefore protrudes from the second seat 12 and lies below a first tab 17 that protrudes from the first half-shell 7a in the direction of the second half-shell 7b.

The first tab 17 is extended along a circular arc until it surmounts the cut end 13 of the second half-shell 7b and therefore also the underlying first crown-shaped head 11 of the screw 10, once it is associated with the second half-shell 7b.

A third seat 18 is provided in the second half-shell 7b, at right angles to the axis of said first seat 8 and therefore to the axis of the first stem 9 and starting from the flat portion 14, and is open in a downward region and is not connected to the adjacent second seat 12.

The distance between the flat portion 14 and the outer perimetric surface 19a, 19b of the first and second halfshells 7a, 7b is substantially equal to the height of the first head 11 of the screw 10, which thus does not protrude beyond the cylindrical body 4.

In the third seat 18 it is possible to arrange temporarily the insert 37 and the third stem 59 of the first tool 49 provided with the third head 48 that is adapted to couple kinematically with the first head 11 accommodated in the second seat 12.

The second half-shell 7b has, starting from the cut end 13 and so as to surround the opening 16 provided on the front partition 15a, a second tab 25 that protrudes in the direction of the first half-shell 7a so as to trace a circular arc that is concentric to the first seat 8 so that during the axial coupling of the first half-shell 7a with the second half-shell 7b it is arranged within the first seat 8 and adjacent to its inner lateral surface.

The first end 26 of the first stem 9 of the screw 10 rests rotatably on the second tab 25 and in turn protrudes from the first crown-shaped head 11.

The materials used, as well as the dimensions that constitute the individual components of the disclosure, may of course be more pertinent according to specific requirements.

The characteristics indicated as advantageous, convenient or the like may also be omitted or be replaced with equivalents.

The disclosures in Italian Patent Application No. 102015000028424 (UB2015A001753) from which this application claims priority are incorporated herein by reference.

The invention claimed is:

1. A joining device for joining a shelf to a wall of a piece of furniture, the joining device comprising a cylindrical body that is inserted in a first hole provided transversely in said shelf and having a first axial seat for the rotatable coupling of a first stem of a screw provided with a first crown-shaped head arranged rotatably within a second seat that is adjacent to said first seat, wherein a second hole is provided in said shelf at right angles to said first hole and accommodates, substantially flush with or below an upper surface of said shelf, an insert, said insert being provided with a seventh seat for a third head of a first tool that can be coupled rotatably with said first crown-shaped head.

2. The joining device according to claim 1, wherein said cylindrical body is composed of a single shell that has a substantially cylindrical and internally hollow shape and on an internal lateral surface of which, defined at said first seat, said first stem rests rotatably, proximate to the part of said first stem that protrudes from said first head of said screw there being an annular recess that interacts with an annular tooth that is adapted to block the axial sliding of said screw.

3. The joining device according to claim 2, wherein said single shell has an outer lateral surface on which there is, at right angles to an axis of said first and second seats and to an axis of said first stem, a third seat or hole inside which it is possible to arrange temporarily said third head of said first tool, a separate sixth seat or hole being provided in said shell to the side of said third seat or hole and parallel thereto and on the opposite side with respect to said first head of said screw, affecting the entire diameter of said shell and passing through it.

4. The joining device according to claim 3, wherein said insert has a substantially cylindrical shape and has, once the joining device has been assembled, a height between said upper surface of said shelf and the outer lateral surface of said cylindrical body that allows said insert to enter partially said third seat.

5. The joining device according to claim 3, wherein a seventh through seat is provided axially in said insert and is axially offset with respect to a central axis of said insert so as to arrange itself along the same axis as said third seat or hole, provided in said cylindrical body, in which it is possible to arrange temporarily said third head of said first tool.

6. The joining device according to claim 5, wherein a distinct eighth seat is provided adjacent to said seventh seat and parallel thereto and also is axially offset with respect to the central axis of said insert, so as to arrange itself along the same axis as said sixth seat or hole, said eighth seat having a diameter configured to allow the passage of a second tool for the optional adjustment of a foot associated with said piece of furniture in a region that lies below and is axially aligned with said eighth seat.

7. The joining device according to claim 6, wherein said insert has a first wing and a second wing, which protrude downward from it, said first wing resting in a lower region on an internal lateral surface of said shell and protruding and being extended at the side of said seventh seat that is adjacent to said eighth seat, said third head of said first tool being arrangeable temporarily within said seventh seat.

8. The joining device according to claim 7, wherein a flat lateral surface of said first wing directed toward said first head of said screw is partially hollow so as to obtain a ninth seat that is shaped complementarily to the end of said third head of said first tool, said ninth seat forcing the coupling of said third head with said first head of said screw.

9. The joining device according to claim 8, wherein said seventh seat, provided in said insert, and said ninth seat, provided in said flat lateral surface of said first wing, are arranged along the same axis and are axially offset with respect to both the central axis of said insert and the axis of said third seat or hole, so as to be inclined to form an acute angle, considering a counterclockwise rotation as positive, with respect to the plane of arrangement of said upper surface of said shelf, said ninth seat being shaped complementarily to said end of said third head of said first tool, which can be coupled rotatably to said first crown-shaped head.

10. The joining device according to claim 8, wherein the flat lateral surface of said first wing directed toward said first head of said screw is partially hollow so as to obtain a ninth seat, which is shaped complementarily to said third stem of said tool.

11. The joining device according to claim 7, wherein said second wing surrounds and defines said eighth seat, is located within said sixth seat and is lower than said second hole, said second wing being connected in a lower region to a complementarity shaped fifth hole provided in said cylindrical body, said sixth seat, which passes through said cylindrical body, defining an access for a second tool that is adapted to allow the optional adjustment of a foot that is associated in a lower region with said shelf if it acts as the bottom of the piece of furniture.

12. The joining device according to claim 7, wherein said first wing has a lower free end that is located at said fifth hole provided in said cylindrical body.

13. The joining device according to claim 5, wherein said seventh seat is provided axially on said insert in axial alignment with the central axis of said insert, so as to arrange itself along the same axis as a third seat or hole, provided in said cylindrical body, in which said third head of said tool can be arranged temporarily, said insert having a height that is substantially less than the depth of said second hole, said insert being insertable in said third seat or hole provided in said cylindrical body.

14. The joining device according to claim 13, wherein said insert has a first wing that protrudes from it in a lower region at said seventh seat and is extended radially at the part of said seventh seat that contains a third stem of said tool, said first wing having a lower free end that is located at a fifth hole provided in said cylindrical body.

15. The joining device according to claim 13, wherein said third head of said first tool is substantially pinion-shaped and is adapted to couple kinematically with said first head accommodated in said second seat, said third stem protruding from the end of said third head and being accommodatable within said complementarily shaped ninth seat.

16. The joining device according to claim 1, wherein an extraction prevention or bolt function is provided by said insert, which locks said cylindrical body with respect to said shelf since said insert is inserted within said second hole provided in said shelf.

17. The joining device according to claim 1, wherein said insert comprises a substantially cylindrical shape and is higher than the distance that lies, once the joining device has been assembled, between said upper surface of said shelf and the outer lateral surface of said cylindrical body, said insert resting, when installed, on said first head of said screw, while remaining substantially flush with said shelf.

18. The joining device according to claim 1, wherein said cylindrical body is constituted by a first half-shell and a second half-shell, which are substantially cylindrical and internally hollow and can be coupled axially by front coupling.

19. The joining device according to claim 18, wherein said first half-shell is provided with said first axial seat for the rotary mating of said first stem of said screw provided with said crown-like head, said first head of said screw being arrangeable rotatably within said second seat provided proximate to an end, cut along a chord so as to define a flat portion, of said second half-shell that is directed toward said first half-shell.

20. The joining device according to claim 1, wherein said second seat is obtained along a plane that is perpendicular to a plane of arrangement of said first seat, is substantially semicircular and is located between two partitions, a front one of which, directed toward said first half-shell, has a semicircular opening for the placement and passage of said first stem, along the same axis as said first seat.

21. The joining device according to claim 18, wherein part of said first head of said screw protrudes from said second seat and lies below a first tab that protrudes from said first half-shell in the direction of said second half-shell, said first tab being extended along a circular arc until it surmounts a cut end of said second half-shell and therefore also said underlying first crown-shaped head of said screw, once it is associated with said second half-shell.

22. The joining device according to claim 20, wherein said second half shell has, starting from said cut end and so as to surround said opening obtained in said front partition, a second tab that protrudes in the direction of said first half-shell so as to trace a circular arc that is concentric to said first seat so as to be arranged, during the axial mating of said first half-shell with said second half-shell, within said first seat and against its inner lateral surface, said first end of said first stem of said screw resting rotatably against said second tab and in turn protruding from said first crown-shaped head.

23. The joining device according to claim 22, wherein on said second half-shell there is, at right angles to the axis of said first seat and therefore to the axis of said first stem and starting from said flat portion, said third seat, which is open in a lower region, is not connected to said adjacent second seat for the interconnection of said insert and of said third stem of said first tool provided with said third head adapted to couple kinematically with said first head accommodated in said second seat.

\* \* \* \* \*